Aug. 27, 1940.  A. M. WALLACE  2,213,152

TUBE MAKING APPARATUS

Filed Oct. 14, 1938

INVENTOR.
Arthur M. Wallace
BY
Barnes, Kisselle, Laughlin & Raisch
ATTORNEYS

Patented Aug. 27, 1940

2,213,152

UNITED STATES PATENT OFFICE 2,213,152

TUBE MAKING APPARATUS

Arthur M. Wallace, Detroit, Mich., assignor to Bundy Tubing Company, Detroit, Mich., a corporation of Michigan Application October 14, 1938, Serial No. 235,054

6 Claims. (Cl. 219—12)

This invention relates to the making of tubing and it has to do particularly with an apparatus for making tubing where the tube is heated for uniting parts juxta-positioned in plies or seams, or both.

The invention is directed particularly to an arrangement for controlling the function of a tube-making apparatus with reference to the maintenance of a proper temperature of the tube and with the maintenance of a proper position of the tube. To this end an electrical control apparatus including a so-called photoelectric cell is combined with a tube-making apparatus, with the photoelectric cell positioned to be acted upon by rays from the tube. In accordance with the invention, after the machine is in operation, the temperature of the tube may be accurately maintained as well as the position of the tube. If the temperature of the tube drops below a certain point, at which improper tube will result, the control apparatus functions to stop the operation of the mechanism; if the temperature gets too high, the control apparatus functions to stop operation of the apparatus; if the tube gets out of position or buckles, the control apparatus likewise causes a cessation of the operation of the apparatus.

The invention may be embodied in an apparatus for making tubing from strip metal stock wherein the stock is moved longitudinally and fashioned into tubular form and wherein the tube is finally closed and sealed by a heat treatment wherein a molten sealing metal fuses to unite the seam or seams and to unite the plies where a plural ply tube is made. The specific disclosure herein includes the disclosure of an apparatus for making double ply tube from two strips of stock wherein the plies and seams are sealed by a fused sealing metal, but it will be appreciated that the invention may be incorporated with a tube making apparatus for making a tube of single ply or multiple ply or from one or more strips of stock. In any event, the tube is heated in the course of manufacture and the control apparatus governs the functioning of the apparatus in a manner depending upon the maintenance of a proper heat and proper tube condition.

Figure 1:
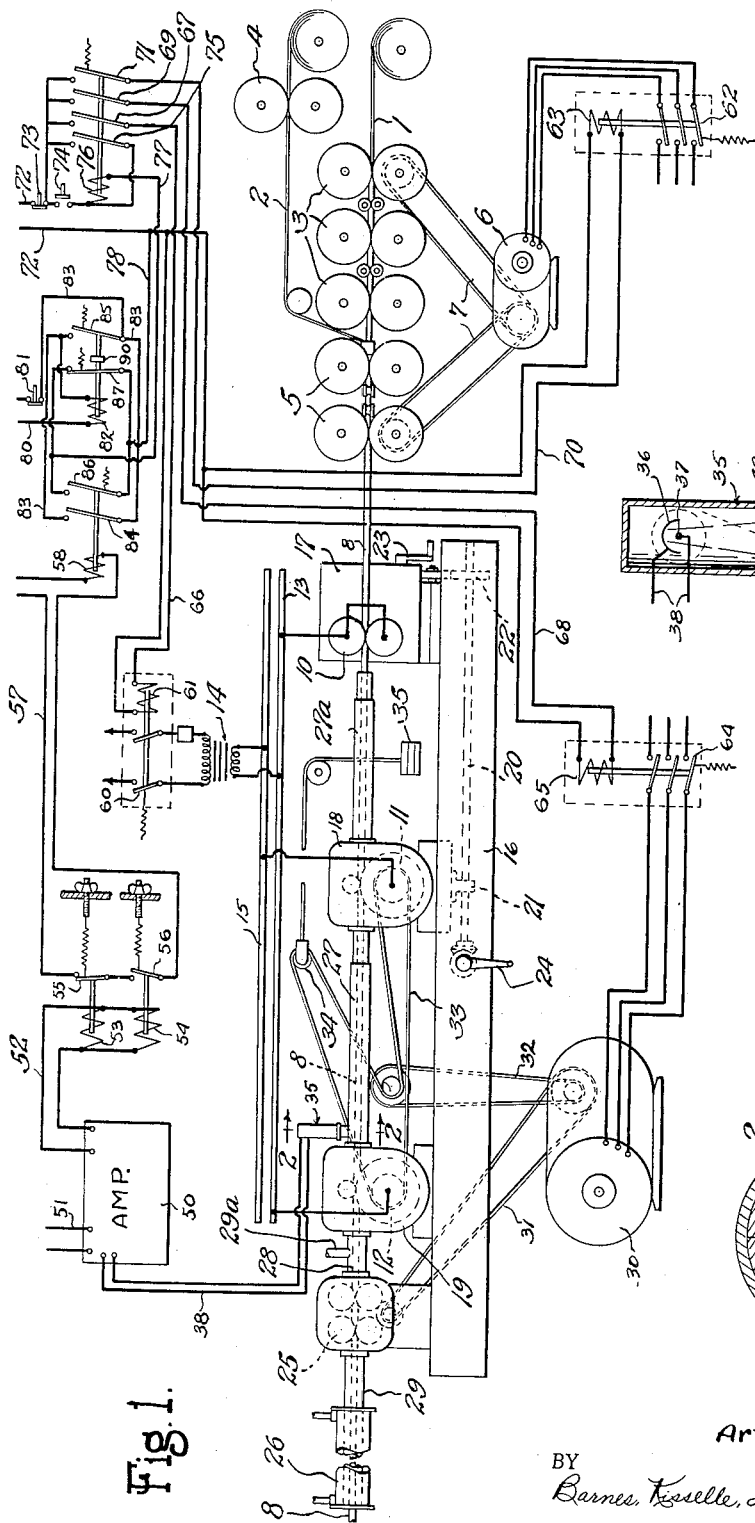
Fig. 1 is a general view illustrating a tube-forming apparatus and showing the electrical control means and wiring diagram laid over the apparatus more or less diagrammatically.
Figure 4:
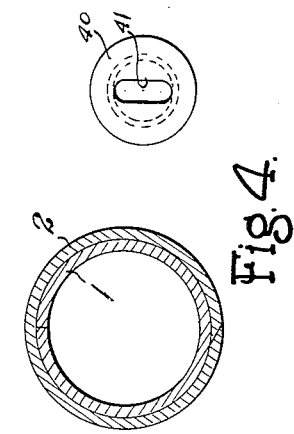
Fig. 4 is a cross-sectional view illustrating a tube which maye be made on the apparatus illustrated.

The tube-forming apparatus illustrated in Fig. 1 is shown as comprising a tube mill for forming two strips 1 and 2 into tubular form. As shown in Fig. 4, the strip 1 forms the inner ply with a butt seam, and the strip 2 forms the outer ply with a scarfed seam. A set of rollers in the tube mill, as illustrated at 3, fashions the strip 1 in tubular form, while the rollers 4 bevel the edges of the outer strip, and the set of rollers 5 are arranged for the tubular inner ply to pass therethrough, and they fashion the outer strip around the inner ply. Certain of the rollers of the tube mill may be driven by means of a motor 6 operating through belts or chains 7. Any number of the rolls of the tube mill may be driven. Such a tube mill is well known to those versed in the art and need not be further described.

The seams and plies of the tube are to be sealed by a metal which is rendered molten, and the metal may be carried into position in the form of a coating or plating on one or both strips. The strip stock may be ferrous metal and the sealing metal may be soft solder such as lead and tin, or a hard solder such as a cuprous alloy or copper. These metals are given as examples but it will be understood that other metals may be used. For completing the tube with the sealing metal, the tube is heated to render the sealing metal molten. As shown herein, the tube is heated by passing an electric current therethrough to heat successive sections of the tube by electrical resistance.

The heating apparatus may be but generally described and comprises electrodes 10, and electrodes 11 and 12, with electrodes 10 and 12 connected to a bus-bar 13 electrically connected to one side of the secondary of a transformer 14, while the intermediate electrode 11 is connected to a bus-bar 15 electrically connected to the opposite side of the secondary. As the tube passes through the apparatus electrical current flows between electrodes 10 and 11, and 12 and 11, the current passing through the tube and heating it. There is no potential across electrodes 10 and 12, and accordingly the tube mill and other portions of the apparatus do not have to be insulated.

The device comprises a frame 16 for slidably supporting a carrier 17 for the electrodes 10 and a housing 18 for the electrode 11. Electrode 12 is also disposed within a housing 19. Journaled in the frame is a screw-threaded shaft 20 having a threaded connection as at 21 with the housing 18 and having a threaded connection with a gear 22 carried by the housing 17. Upon rotation of the crank 23 on housing 17, the gear 22 is rotated and housing 17 and electrodes 10 are adjusted relative to the housing 18. By revolving the shaft 20 through the handle 24, electrodes 10 and 11 are simultaneously adjusted toward or away from the electrode 12. These adjustments permit of varying the length of the section of tube between the electrodes, and accordingly, the resistance and resultant heating action. The arrangement is preferably such that the tube is brought up to a proper temperature between electrodes 10 and 11, and this proper temperature is maintained in that distance between electrodes 11 and 12. A set of pulling rolls is illustrated in a housing at 25, and a cooler is illustrated at 26. A telescoping tubular housing 27 connects the housings 18 and 19. An adjustable tubular housing 27a is carried by the housing 18 and projects toward the electrodes 10, and enclosing tubular members 28 and 29 are located respectively between the housing 19 and the pulling roll housing, and between the pulling roll housing and the cooler. The pulling rolls 25 may also apply pressure to the tube. Where a metal such as copper is used for the sealing metal, the tube should be maintained in a reducing or neutral atmosphere while in a heated condition; such a gas may be introduced through a pipe 29a so that the tube which is enclosed by the several interconnecting housings and tubular members is enveloped by a neutral or reducing gas while in a heated condition.

A motor 30 is arranged to drive certain of the rolls of the heating unit. The pulling rolls 25 may be driven by a belt or chain 31 and electrodes 11 and 12 may be driven through a belt or chain 32. A belt 33 operates over pulleys as shown for driving the electrodes 11 and 12, and over an idler pulley 34 acted upon by a suspended weight 35. The belt or chain 32 drives the belt 33 as the same operate over the pulleys, as indicated. The suspended weight permits of a shortening or lengthening of the belt 33 automatically on adjustment of the electrode 11 toward and away from the electrode 12.

Briefly describing the operation of this structure, the two strips are caused to move lengthwise through the tube mill where they are fashioned into a tube such as illustrated in Fig. 4, and with continued lengthwise motion the fashioned tube passes between and in contact with the electrodes, is brought up to heat between the electrodes 10 and 11 and this heat is maintained between electrodes 11 and 12. This causes the sealing metal to melt and upon cooling seals and unites the seams and plies passing through the cooler 26 for this purpose. By maintaining the desired heat between electrodes 11 and 12 a time period is provided in which the sealing metal is maintained molten to give the metal time to flow over and between and to unite juxtapositioned surfaces. The power input between electrodes 11 and 12 may be regulated so as to merely offset heat loss due to radiation, etc. Where copper is used as the sealing metal on ferrous strip stock it is preferred that the temperature of the tube between electrodes 11 and 12 be maintained within a prescribed range, say, for example, from 1200° C. to 1250° C. If for any reason the temperature drops below the minimum the control apparatus causes the discontinuance of the operation of the machine; if the temperature for any reason rises above the maximum, the control apparatus functions to cause the discontinuance of the machine. These temperatures are given as examples only, it being understood that other temperatures may be maintained where other metals are used and where other conditions require different temperatures. Likewise, if the tube buckles or gets out of line, operation of the machine is discontinued.

Figure 2:
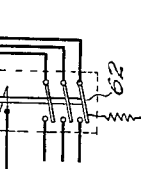
Fig. 2 is a cross sectional view taken substantially on line 2—2 of Fig. 1 showing the photoelectric cell.
Figure 3:
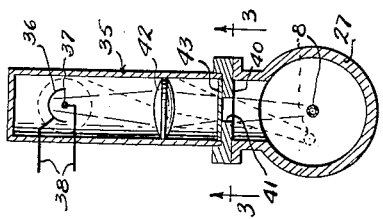
Fig. 3 is a sectional view of a device apertured for the passage of rays therethrough.

To these ends a photoelectric cell generally indicated at 35 is positioned to receive rays from the tube at a proper location between the electrodes 11 and 12. The cathode 36 and the anode 37 are electrically connected to an amplifier by the leads 38. In Fig. 2 this arrangement is shown, the tube being indicated at 8 within the housing 27. The device includes an apertured shield 40 having an elongated or slot-like aperture 41 therein for the passage of rays therethrough, the rays passing through a lens 42 which concentrates the rays on the cell. A transparent closure 43 seals the chamber from the tube. As illustrated in Fig. 2, the rays for the tube pass through the aperture 41 and transparent closure 43 and are concentrated by the lens 42. Should the tube buckle or get out of line, as illustrated by the dotted lines, the rays are directed through the aperture 41 in an angular manner, and, therefore, are not concentrated on the cell. This results in stoppage of the machine.

The amplifier is indicated at 50, having a power supply line 51 and a circuit 52 leading therefrom, in which circuit are solenoids 53 and 54 connected in parallel. These solenoids are arranged to act upon armatures for controlling, respectively, a spring-actuated normally closed switch 55 and a spring-actuated normally open switch 56, which are preferably adjustable as by means of varying the spring tension, as indicated. These switches are in a circuit indicated at 57 which supplies current for a solenoid 58. A switch for the welding circuit primary is generally indicated at 60, and is arranged to be closed by the action of a solenoid 61. A switch in the power line for the motor 6 is generally indicated at 62 and is arranged to be closed by a solenoid 63. A switch in the power line for the motor 30 is generally indicated at 64 and is arranged to be closed by the action of a solenoid 65. The solenoid 61 is in a circuit 66 which extends through a single pole switch 67; the solenoid 65 is in a circuit 68 which extends through a single pole switch 69; the solenoid 63 is in a circuit 70 which extends through a single pole switch 71; all the circuits lead back to the main lines 72. A stop switch 73 is between the main line and the several single pole switches and this switch is normally closed, and a normally open starting switch 74 is placed in parallel with the single pole switch 75. A solenoid 76 is connected into one of the lines 72 so as to be energized by the action of the switch 74 or switch 75, the circuit of the solenoid being completed through a lead 77 and lead 78.

A power line 80 having a normally closed re-set switch 81 therein connects to a solenoid 82, which in turn is connected to a lead 83 running through a single pole switch 84. A single pole switch 85 is connected in parallel with the switch 84. The lines 77 and 78 are arranged to be connected through a single pole switch 86 and a single pole switch 87. Switches 86 and 87 are in parallel, as indicated. The solenoid 82 is arranged to operate switches 85 and 87, one being closed when the other is open, and the solenoid 58 is arranged to close the switches 84 and 86.

The operation is as follows: When the machine is not operating the various switches are in the positions as shown in the drawing. To start the machine an operator closes the starting switch 74. This energizes the coil 76 through line 77, switch 87, and line 78. The action of the solenoid closes switches 75, 67, 69 and 71. Upon the closing of switch 75 the operator may release the normally open starting switch 74 because switch 75 maintains the circuit for the solenoid 76 closed. Switch 67 closes a circuit to and energizes solenoid 61 for the closing of the primary of the welding circuit; switch 69 closes a circuit to and energizes the coil 65 for the closing of the circuit for the driving motor 30; switch 71 closes a circuit and energizes coil 63 for the closing of the circuit for the driving motor 6. Thus the driving motors and several driving rolls of the machine are set into operation and the welding circuit closed so that current is passed across the electrodes through the tube for heating the same.

This condition will maintain until the tube reaches a temperature above the set minimum, which, for example, may be 1200° C. At this time the rays from the tube which are active upon the cell causes an increase in the voltage in the circuit 52 and the solenoid 54 closes the switch 56. However, the voltage is not yet sufficient to cause solenoid 53 to open switch 55. Upon closing switch 56 the solenoid 58 is energized to close the switches 84 and 86. When switch 84 closes, the circuit for the solenoid 82 is completed; when switch 86 closes the circuit between lines 77 and 78 for the solenoid 76 is closed across this switch. Upon energization of the solenoid 82 the switch 87 is opened, thus breaking the circuit for the solenoid 76 through this switch. However, switches 86 and 87 are timed so that 86 closes before 87 opens, so that the circuit for the solenoid 76 is not broken at this time. To this end the armature for solenoid 82 may have a lost play movement relative to the switch 87 and may cause switch opening due to an abutment 90 on the armature which engages the switch arm 87. Also at this time switch 85 is closed and switch 85 and switch 84 are now connected in parallel in circuit for the solenoid 82.

Thus it will be noted that by the simple operation of closing the starting switch 74 manually, the machine is set in operation, and when the tube comes up to the determined minimum temperature, solenoid 54 functions to close the circuit 57 and causes the switches 84, 85 and 86 to close and the switch 87 to open, thus conditioning the system for an automatic operation controlled by the temperature or the condition of the tube. The machine will continue to operate so long as the tube is in its right path and within the limits of the temperature range.

If the temperature of the tube drops below the required minimum, the voltage in the line 52 is decreased, with the result that the solenoid 54 permits switch 56 to open. This breaks the circuit for solenoid 58 and opens switches 84 and 86. However, solenoid 82 remains energized through the switch 85, with the result that switch 87 remains open. The opening of switch 86 de-energizes the solenoid 76 and the switches 75, 67, 69 and 71 open, thus breaking the circuits for the several controlling solenoids 61, 65 and 63, and cutting off the current for the driving motors and breaking the welding circuit, thus stopping the machine.

If in the course of the operation of the apparatus the temperature gets too high, say above the predetermined maximum of 1250° C., the voltage in line 52 increases and causes solenoid 53 to open switch 55. This de-energizes solenoid 58 and solenoid 76, in the manner described above, and again, the welding circuit and the power circuits for the driving motors are opened, and the machine stops. Likewise, if the tube for some reason buckles or moves out of line as shown in Fig. 2, the rays are not then concentrated on the cathode, with the result that the voltage in line 52 drops, causing solenoid 54 to permit switch 56 to open. As above described, this de-energizes solenoids 58 and 76, thus bringing the machine to a stop.

When the machine is thus automatically stopped by any one of these three conditions, solenoid 82 remains energized. In order to condition the system for a second start the switch re-set 81 is momentarily opened, thus de-energizing solenoid 82 and permitting switch 87 to close and switch 85 to open, so that upon re-closing of the re-set switch 81 the circuit for the solenoid 82 is broken by both switch 85 and 84. This completes the cycle, and after the difficulty has been rectified, and it is again desired to start the machine, the operator again closes the switch 74 momentarily to energize solenoid 76 through switch 87.

It will be observed that the machine may be put out of operation at any time by means of the operator opening the stop switch 73. Such action de-energizes solenoid 76, thus causing the switches 75, 67, 69 and 71 to open, discontinuing the circuits for the welding current and driving motors. This will have the effect of immediately allowing the temperature of the tube to drop below the set minimum and switch 56 will open, de-energizing switch 58, and causing switches 84 and 86 to open. After the machine has been thus stopped manually, the re-set switch 81 must be momentarily opened to de-energize the coil 82, in order to re-set switches 87 and 85 in closed and open position respectively.

I claim:

1. In combination, means for propelling a tube fashioned from strip metal stock longitudinally, means for heating successive sections of the entire tube to cause contiguous portions of the strip to unite to seal the tube, a photoelectric cell sensitive to and positioned to receive rays from the heated tube, an electrical circuit for the cell, the value of the current in which varies incident to variation of the rays effective upon the cell, means including electrical circuits with switches for controlling the operation of the propelling means and heating means, and means operable upon variation of the value of the current in the photoelectric cell circuit incident to variation in the temperature of the tube below and above a predetermined temperature range, for actuating the switches to stop operation of the propelling means and heating means.

2. In combination, means for propelling a tube fashioned from strip metal stock longitudinally, means for heating successive sections of the entire tube to cause contiguous portions of the strip to unite to seal the tube, a photoelectric cell sensitive to rays from the heated tube, means arranged to direct rays from the tube on to the cell when the tube is moving in a proper operating path and for directing rays off the cell upon lateral movement or buckling of the tube, an electrical circuit for the cell, the value of the current in which varies incident to variation of rays effective upon the cell, means including electrical circuits with switches for controlling the operation of the propelling means and heating means, and means operable upon variation of the value of the current in the photoelectric cell circuit, incident to variation in the temperature of the tube below and above a predetermined temperature range, and incident to said lateral movement or buckling of the tube, for actuating the switches to stop operation of the propelling means and heating means.

3. In combination, means for propelling a tube fashioned from strip metal stock longitudinally, means for heating successive sections of the entire tube to cause contiguous portions of the strip to unite to seal the tube, a photoelectric cell sensitive to and positioned to receive rays from the heated tube, an electrical circuit for the cell, the value of the current in which varies incident to variation of the rays effective upon the cell, means including electrical circuits for controlling the operation of the propelling means and heating means, and means operable upon variation of the value of the current in the photoelectric cell circuit, incident to variation in the temperature of the tube below and above a predetermined temperature range, for opening the electrical controlling circuits to stop operation of the propelling means and heating means.

4. In combination, means for propelling a tube fashioned from strip metal stock longitudinally, means for heating successive sections of the tube to cause contiguous portions of the strip to unite to seal the tube, a photoelectric cell sensitive to and positioned to receive rays from the heated tube, an electrical circuit for the cell, the value of the current in which varies incident to variation of the rays effective upon the cell, two solenoids in the photoelectric cell circuit, means including electrical circuits with switches for controlling the operation of the propelling means and heating means, a relay circuit, a normally closed switch in the relay circuit acted upon by one of the solenoids in the photoelectric cell circuit, a normally open switch in the relay circuit acted upon by one of the solenoids in the photoelectric cell circuit, the normally closed switch being arranged to be opened when the value of the current in the photoelectric cell circuit varies incident to a temperature of the tube above a predetermined temperature range, the normally open switch being arranged to be held closed while the temperature of the tube is within said predetermined temperature range and to be opened incident to variations in the value of the current in the photoelectric cell circuit when the temperature of the tube drops below said predetermined temperature range, and means operable upon the opening of the relay circuit for actuating the switches in the controlling circuits to stop the operation of the propelling means and heating means.

5. In combination, means for propelling a tube fashioned from strip metal stock longitudinally, means for heating successive sections of the tube to cause contiguous portions of the strip to unite to seal the tube, means including electrical circuits with switches for controlling the operation of the propelling means and heating means, a solenoid for closing the switches to start operation, a manually controlled switch for energizing the solenoid, a circuit for maintaining the solenoid energized subsequent to opening of the manually controlled switch, a photoelectric cell sensitive to and positioned to receive rays from the heated tube having a circuit arranged to de-energize said solenoid when the temperature of the tube exceeds a predetermined temperature range, means operable incident to variation of the value in the photoelectric cell circuit when the temperature of the tube reaches the lower limit of the predetermined temperature range to close and maintain closed a second circuit for energizing the said solenoid and for opening the first circuit for energizing said solenoid for continued operation of the heating and propelling means subsequent to and so long as the temperature of the tube is within said temperature range, said last named means being operable incident to a drop in the temperature of the tube below said predetermined range to de-energize said solenoid and operate the switches to discontinue the operation of the propelling means and heating means.

6. In combination, means for propelling a tube fashioned from strip metal stock longitudinally, means for heating successive sections of the tube to cause contiguous portions of the strip to unite to seal the tube, means including electrical circuits with switches for controlling the operation of the propelling means and heating means, a solenoid for closing the switches to start operation, a manually controlled starting switch for energizing the solenoid, a first circuit for maintaining the solenoid energized subsequent to opening of the said starting switch, a photoelectric cell sensitive to and positioned to receive rays from the heated tube having a circuit arranged to de-energize said solenoid when the temperature of the tube exceeds a predetermined temperature range, for the opening of said switches, means operable incident to variation of the value in the photoelectric cell circuit when the temperature of the tube reaches the lower limit of the predetermined temperature range to close and maintain closed a second circuit for energizing the said solenoid and for opening the first circuit for energizing said solenoid for continued operation of the heating and propelling means subsequent to and so long as the temperature of the tube is within said temperature range, said last named means being operable incident to a drop in the temperature of the tube below said predetermined range to de-energize said solenoid and operate the switches to discontinue the operation of the propelling means and heating means, and a second manually controlled switch operable to recondition the said first energizing circuit for said solenoid for the closing thereof by the starting switch, and to open the second energizing circuit to recondition the same for its closing when the temperature of the tube is again brought up to said temperature range.

ARTHUR M. WALLACE.